Patented Mar. 11, 1952

2,588,419

UNITED STATES PATENT OFFICE 2,588,419

WHIPPING COMPOSITION

Herbert E. Sevall and Raymond P. Schaeffer, Elgin, Ill., assignors to The Borden Company, New York, N. Y., a corporation of New Jersey No Drawing. Application October 6, 1949,
Serial No. 119,987

8 Claims. (Cl. 99—114)

This invention relates to a whipping composition for use in food products.

The composition is particularly useful in the manufacture of frappé or mazetta and the like for confections. For this reason, the invention will be first illustrated by description in connection with such use.

As the whipping agent in this art, egg white is used extensively. While satisfactory in almost all regards, egg white is high in cost per pound of dry material. Since the problem of a more economical replacement has existed for a long time, there have been numerous attempts to use vegetable proteins to replace the egg white. Such vegetable protein material as a water soluble soy protein derivative has been used with moderate success at least for a number of products including candy bars. This derivative has been unsatisfactory, however, in some of those use in which stability of the whipped frappé or cream and smoothness of texture of the finished product are required.

The present invention provides a composition of about the same cost as the vegetable protein base previously proposed but of proper texture in the finished product and storage life at room temperature that runs as high as egg white. This storage life before break-down of the whipped material is twice the life previously possible with the vegetable protein material.

Briefly stated, the invention comprises a whipping composition including a water soluble, partially digested or degraded soy protein as the base and a protein precipitating agent such as a sodium phosphate in minor proportion, the agent serving as a stabilizer when the composition has been whipped in an aqueous medium. In one embodiment, the invention comprises such composition including also a strengthening agent and acidic material establishing the pH at a level within the range 4 to 7. In a modification there is added a small proportion of water soluble non-toxic bivalent salt, particularly a calcium salt in combination with an alginate serving as the strengthening agent.

A product made in accordance with the modification and referred to for convenience as "Whitson's 100" was compared with soy albumen alone and with egg albumen, each used in the proportion of 2%, in mazettas that were the same except for the whipping agent selected. Stability of the several mazettas whipped in water was determined by noting the time required for breakdown (appearance of a separated water layer) at room temperature. The results follow:

*Stability of whipped mazettas*

| Whipping Agent | Stability Days Before Break-down |
|---|---|
| Soy albumen alone (conventional) | 57 |
| Whitson's 100, run No. 1 | 114 |
| Whitson's 100, run No. 2 | 118 |
| Egg albumen, sample 1 | 98 |
| Egg albumen, sample 2 | 120 |

The texture of the Whitson 100 products was excellent.

The digested, that is, the degraded, soy protein used in all of the compositions listed in the table above is made in a conventional manner. The degradation is to the stage which is water soluble although more complex than a simple peptide and to a derivative having foaming properties when tested in conventional manner. An example of a material that is satisfactory as the base ingredient in the whipping composition is the enzyme degraded soy protein known in the confectionery trade as "soy albumen." The analysis of a representative soy albumen that we may use is as follows:

| | Per cent |
|---|---|
| Moisture | 4.9 |
| Protein (degraded) | 63.3 |
| Ash | 14.0 |
| Fat | 0.7 |
| Carbohydrate (by difference) | 17.1 |
| Total | 100.0 |

Agents that precipitate normal proteins from solution are well known. The protein precipitating agent serves in our whipped products, not to precipitate but to stabilize the degraded protein structure. The agent is preferably sodium phosphate. Examples of the phosphate that may be used are sodium hexametaphosphate, sodium tetraphosphate, tetrasodium pyrophosphate, and sodium orthophosphate. These phosphates are precipitants for proteins in solution. There is no advantage in using other phosphates or other known metal salt precipitants for proteins over the relatively inexpensive sodium phosphates.

The strengthening agent used is a gummy material that may be either natural or synthetic. It is a material which has the property of greatly increasing the viscosity of an aqueous medium even when dissolved therein in small proportion. It must be non-toxic and edible. Examples of agents that meet these requirements are a water soluble alginate such as the reaction product or ester of alginic acid with propylene glycol and sodium alginate, carboxymethyl cellulose, and Irish moss extract.

The acidic material to establish the pH within the necessary range is preferably one of the food acids such as lactic, citric, tartaric, malic, or acetic acid. In one procedure the acidic material is a part of the soy protein derivative as supplied to the mixing operation for making the entire whipping component.

The calcium or other bivalent metal salt when used in the composition should be water soluble and non-toxic. Examples of such salts are calcium citrate, lactate, acetate, and tartrate.

As to the mechanism by which the stabilized whipped product is produced, the following is considered as the explanation of the result in part at least. The foaming or whipping property resides in the soy protein derivative. This used by itself has whipping quality. On addition of the phosphate, the stability of the resulting fluff or frappé is greatly increased due to some interaction between the protein derivative and the phosphate in some manner such as protein denaturation that strengthens the structure of the whipped protein derivative. The algin or the thickener has water holding qualities. Upon reaction with a slightly soluble calcium salt, the algin compound particularly forms an insoluble gel which, under certain circumstances, is quite rigid. This gel serves as a strengthening agent for the degraded protein structure. It appears that the form produced by the phosphate-protein combination is sufficiently stable, so that the insoluble rigid gel has time to form within the framework of the original foam and thus provides a greatly prolonged stability.

Proportions of the several materials may be varied somewhat in accordance with the physical properties desired in the final whipped product. The soy protein derivative should constitute over half of the whipping composition. For proper stability under all conditions to which the composition may be subjected in use, the soy protein derivative should constitute 80 to 95 parts by weight for 100 parts of the whole composition and the sodium phosphate or other stabilizer 2-15 parts. When the additional ingredients are used, the strengthening agent should be in the proportion of 0.5 to 3 parts and the soluble calcium salt 0.1 to 1 part. Proportions here and elsewhere herein are expressed as parts by weight.

Since the effectiveness of the acid in establishing a given level of pH varies with the specific acid selected, the proportion of the selected acid is such as given to the finished whipping composition, when dissolved in ten times its weight of water, a pH within the range 4 to 7. This requires ordinarily 0.25 to 2 parts of the acid.

The ingredients may be mixed with each other in any convenient manner. We have found desirable mixing the soy protein derivative of kind described while it is still in the aqueous solution resulting from the degarding and purifying step with the other solid materials other than the gum or strengthening agent. The solution is then evaporated to dryness. This we have accomplished to advantage by spray drying in accordance with usual technique. The gum is then mixed dry. In this manner, there is avoided (1) premature action of the gum with the calcium ion until the time of solution for whipping or (2) the weakening effect of an additional evaporation on the strength of the gum. In the use of the whipping composition in making finished food products, conventional ingredients, proportions, and general operating conditions and technique are used except that our whipping composition is substituted pound for pound on the dry basis for the egg white previously used. Products so made are considered equal in quality at least to the products made with the egg white and there is a saving of approximately half the cost of the whipping agent due to the use of the composition made as described herein.

The invention will be illustrated in greater detail by description in connection with the following examples.

*Example 1*

To 17,000 lbs. of soy protein derivative solution, containing 1,410 lbs. soy protein derivative at pH approximately 5.5, is added 71 lbs. sodium hexametaphosphate, 28 lbs. citric acid, and 4 lbs. calcium lactate, all being completely dissolved and well mixed. The resulting solution is spray dried. They dry product is subsequently dry blended with propylene glycol algin derivative, using 2 lbs. of the algin for each 100 lbs. of spray dried product.

The product was a white powder of low density weighing about 4 pounds to the gallon. This product is "Whitson's 100" of stability in whipped condition shown in the tabulation above.

*Example 2*

A candy mazetta was prepared as follows: 23 parts of the "Whitson's 100" whipping agent were dissolved in 69 parts of water. This solution was added to 453 parts of corn syrup in a candy maker's beater with a vertical shaft and heavy stirrer blades. The mixture was then beaten at low speed in the beater for 5 minutes and then at high speed for 8 minutes. This beating gives a cold syrup fluff. To this fluff in the beater there was added a prepared mixture known as a "cooked bob." This "cooked bob" is prepared by mixing 567 parts of cane sugar, 113 parts of corn syrup, and water in small proportion to prevent scorching and then heating the mass to 250° F. The resulting mixture of the cold fluff and the "cooked bob" was beaten at low speed for 2 minutes as the addition of the "cooked bob" was being made and then for 1 minute.

A glass jar of the resulting whipped composition was allowed to stand at room temperature for observation of the effect of aging on breakdown of the cellular structure. A like specimen prepared in the same manner, but with the use only of the same protein degradation product without any of our special additives, was observed at the same time in a similar glass jar. The results of the observations showed that the whipped product containing the soy protein derivative only as the whipping component showed separation of a layer of water at the bottom of the jar in 38 days as compared with 77 days for the product containing our whole composition. Likewise texture change to unsatisfactory form occurred in 7 to 10 days with the conventional product as compared to 21 to 25 days for our improved mazetta.

*Example 3*

In this example a mazetta was made in conventional manner with enzyme degraded soy protein derivative as the whipping agent and with the addition of 3% of sodium phosphate as stabilizer on the weight of the derivative. This showed a shelf life much longer than a like product containing no phosphate and also a better texture.

*Example 4*

The procedure of Example 1 is followed except for the following substitutions made on a pound for pound basis:

For the algin compound, sodium alginate, carboxymethyl cellulose, or Irish moss extract.

For the citric acid, tartaric, lactic, malic, or acetic acid.

For the calcium salt, any one of the calcium salts, and for the phosphate, any phosphate listed above.

*Example 5*

A frappé is made as follows:

3 lbs. "Whitson's 100" whipping agent
3 lbs. water
50 lbs. corn syrup
50 lbs. sugar Cook sugar and syrup to 238° F. Place in beater and cool down to 160° F. Place whipping agent in solution with water, add the resulting solution to the batch, and beat the whole to desired extent.

*Example 6*

A candy crème is made as follows:

5 lbs. "Whitson's 100" whipping agent
10 lbs. water
75 lbs. sugar
25 lbs. corn syrup
18 ozs. tapioca flour
3 pts. water Dissolve tapioca flour in the 3 pints of water. Add this to the sugar and corn syrup. Cook the mix to 236° F., place it in the beater, and cool to 160° F. Place whipping agent in solution with 10 lbs. water. Add the solution to the beater. Beat at high speed to desired weight. This is a very staple crème and will stand shipping.

In place of the tapioca flour, there may be used another starchy flour, as, for instance, arrowroot, rice, or potato.

*Example 7*

A coated soft center candy is made as follows:

100 lbs. of granulated sugar
4½ gals. water
1½ ozs. cream of tartar.

Cook above mix to 245° F. Then add: 20 lbs. corn syrup. Cook to 247° F. Cool to 120° F. before creaming up. Place in mixing kettle. Remelt slightly. Add:

5 lbs. invert sugar
14 lbs. "Whitson's 100"

Mix till smooth. Add:

10 lbs. sugar
5 lbs. corn syrup
Water to dissolve

Cook to 230° F. Bring heat down to 140° F. Withdraw one bucket, add to contents of bucket flavor, 2 ozs. of invertase, and ½ oz. tartaric acid dissolved in ½ oz. water. Mix well and pour back into batch. Cast in dry starch.

Products made as described contain closely spaced small bubbles of air. The products meet the stability and texture standards set for like products made with egg white.

It will be understood that it is intended to cover all changes and modifications of the examples of the invention herein chosen for the purpose of illustration which do not constitute departures from the spirit and scope of the invention.

What we claim is:

1. A whipping composition, for use in making frappé, mazetta, and like whipped products of high sugar content, comprising water soluble degraded soy protein and sodium phosphate serving as stabilizer for the degraded protein when the composition is whipped in an aqueous medium.

2. A whipping composition, for use in making frappé, mazetta, and like whipped products of high sugar content, comprising water soluble degraded soy protein, a sodium phosphate serving as stabilizer, and a water soluble, gummy material serving to increase the viscosity of the composition when whipped in an aqueous medium and to strengthen the structure of the whipped product.

3. A whipping composition, for use in making frappé, mazetta, and like whipped products, comprising water soluble degraded soy protein, a sodium phosphate serving as stabilizer, and a nontoxic, ediole, acidic material in amount to establish the pH of the composition, when dissolved in 10 times its weight of water, within the range 4 to 7.

4. A whipping composition, for use in making frappé, mazetta, and like whipped products, comprising water soluble degraded soy protein, a sodium phosphate serving as stabilizer, a water soluble, gummy material serving as a strengthening agent, a non-toxic, edible, acidic material in amount to establish the pH of the composition, when dissolved in 10 times its weight of water, within the range 4 to 7, and a water soluble, non-toxic calcium salt.

5. A composition as described in claim 4, the proportion of the several ingredients for 100 parts of total composition on the dry basis being as follows: degraded soy protein, 80 to 95 parts; sodium phosphate, 2 to 15 parts; gummy material, 0.25 to 3 parts; acidic material, 0.25 to 2 parts; and calcium salt, 0.1 to 1 part.

6. A composition, for use in whipping with an aqueous medium, comprising water soluble, enzyme degraded soy protein, a sodium phosphate, a water soluble algin compound, and a water soluble, non-toxic calcium salt.

7. A food product comprising an intimate whipped mixture of the composition of kind described in claim 1, a sugar, and water, the composition containing closely spaced, finely dispersed bubbles of air and being characterized by stability against break down and separation of a water layer during several weeks' storage.

8. A food product as described in claim 7 including intimately mixed starchy flour.

HERBERT E. SEVALL.
RAYMOND P. SCHAEFFER.

REFERENCES CITED

The following references are of record in the file of this patent:

UNITED STATES PATENTS

| Number | Name | Date |
|---|---|---|
| 170,670 | Griffin | Dec. 7, 1875 |
| 2,468,677 | Lindewald et al. | Apr. 26, 1949 |

FOREIGN PATENTS

| Number | Country | Date |
|---|---|---|
| 483,430 | Great Britain | Apr. 20, 1938 |

OTHER REFERENCES

Ser. No. 334,978, Rugamer et al. (A.P.C.), published May 4, 1943.

"Soy Produces a Whipping Agent," by H. G. Butler, The Manufacturing Confectioner, April 1942, pages 12–14.

"Whipping Ability of Soybean Proteins," Betty Monaghan-Watts, Industrial and Engineering Chemistry, vol. 29, No. 9, September 1937, pages 1009–1011.